United States Patent [19]

Lopez

[11] Patent Number: 5,177,491
[45] Date of Patent: Jan. 5, 1993

[54] NAVIGATION RECEIVER WITH BEAM ASYMMETRY IMMUNITY

[75] Inventor: Alfred R. Lopez, Commack, N.Y.

[73] Assignee: Hazeltine Corporation, Greenlawn, N.Y.

[21] Appl. No.: 578,156

[22] Filed: Sep. 6, 1990

[51] Int. Cl.⁵ ............................................. G01S 1/16
[52] U.S. Cl. .................................... 342/408; 342/411
[58] Field of Search ............... 342/408, 411, 413, 360, 342/35, 410

[56] References Cited

U.S. PATENT DOCUMENTS 4,794,543 12/1988 Enein et al. ......................... 342/408

Primary Examiner—Gregory C. Issing
Attorney, Agent, or Firm—E. A. Onders

[57] ABSTRACT

Airborne navigation receivers are designed to derive navigation information with accuracy immune to beam asymmetry errors. Scanned navigation beams of the Microwave Landing System are subject to asymmetry causing beam center measurement errors at power levels other than a standard level 3dB down from peak. Dwell gate and split gate type receivers achieve error immunity through offsetting of errors at power levels above and below a standard power level.

3 Claims, 4 Drawing Sheets $A \geq B$, $C = 1$
$A < B$, $C = 0$

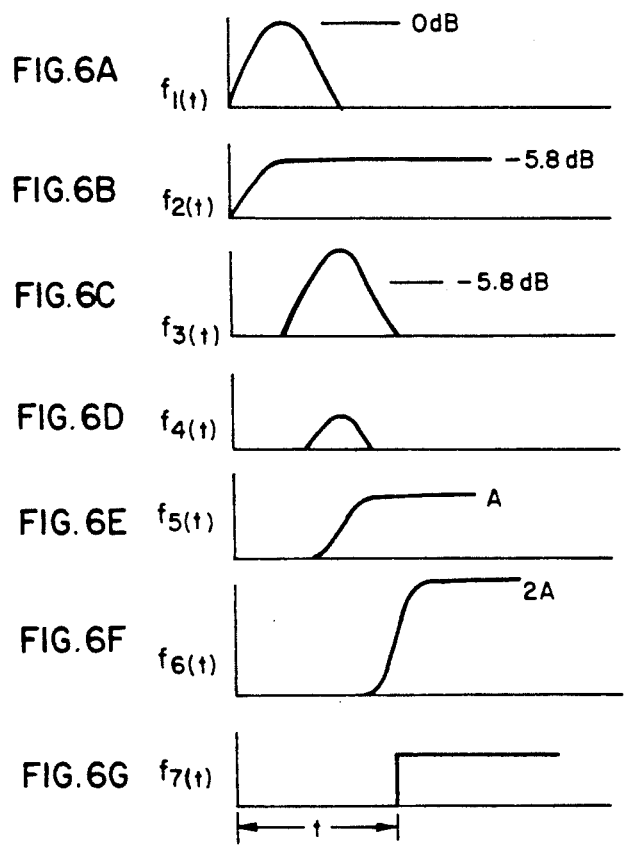
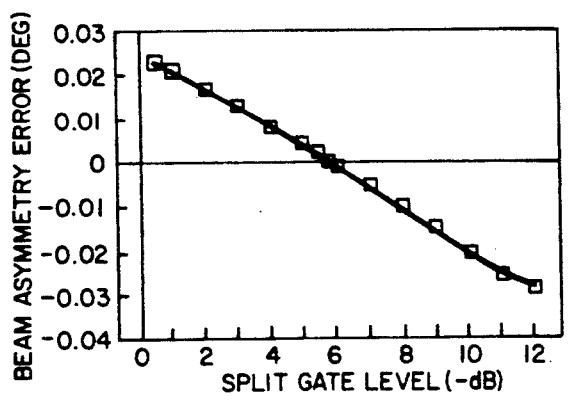
FIG.7
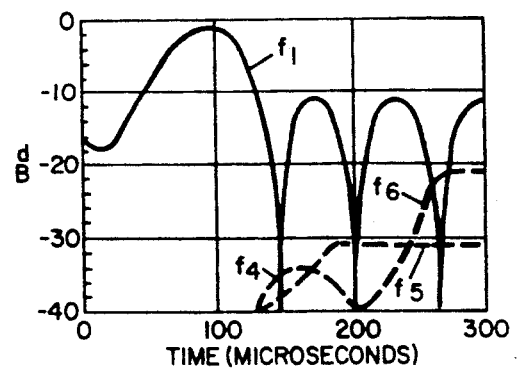
FIG.8

NAVIGATION RECEIVER WITH BEAM ASYMMETRY IMMUNITY

BACKGROUND OF THE INVENTION

This invention relates to airborne navigation receivers and particularly to receivers for deriving aircraft azimuth or elevation data through reception of information from a scanned beam subject to asymmetry The current Microwave Landing System ("MLS") specified by international standards operates by providing angular position information to an aircraft receiver by means of fan-shaped beams which are scanned "TO" and "FRO" across a spatial coverage sector by ground based transmitting equipment. The airborne receiver uses the time of each beam scan to measure the elapsed time between successive TO and FROM scans in each cycle. This time difference is directly proportional to the aircraft's angular position in azimuth or elevation and when processed with distance information provided by associated MLS distance measuring equipment ("DME") the aircraft position in space can be determined.

In an article entitled "Comparison Study of MLS Airborne Signal Processing Techniques", by Kelly and LaBerge. IEEE NAECON "78", May 1978, the characteristics of different types of MLS receivers were considered, including receivers using dwell gate and split gate signal processing techniques. In addition to discussing structure and operation of such receivers, the article addresses the effects of thermal noise and multipath signal reception and the errors caused thereby, but does not consider effects of beam asymmetry.

Beam asymmetry can result from various causes. It is inherent in the azimuth transmission at wide scan angles as a result of the electronic scanning of a horizontal line array antenna and the fact that, in the MLS coding, angle data is linearly related to the azimuth angle rather than to the sine of the azimuth angle. Applicant has determined on the basis of analysis and computed results that, for a three degree beamwidth azimuth beam, at a scan angle of 50 degrees a prior art split gate processor receiver could be subject to a 0.05 degree azimuth error. In elevation, asymmetry results basically from designing the transmission equipment for a minimum size elevation array antenna through reduction of bottom-side sidelobes and increase in power of top-side sidelobes. For antennas optimized in this way, errors in elevation could reach the maximum allowable pursuant to the International Civil Aviation Organization ("ICAO") beam shape specification for MLS, representing errors of 0.075 degrees for a split gate receiver. It should be noted that ICAO standards state "the airborne equipment shall not degrade the accuracy of any decoded angle guidance signal by greater than ±0.017 degrees."

With reference to FIG. 1A, it should be noted that the ICAO standards define the beam center as lying midway between the points on the beam envelope 3 dB below the beam peaks (the "—3 dB points") and provide tolerances for the separation of the —10 dB points from that center line, thereby inherently permitting beam asymmetry. There is no specification for the location of the beam peak. As shown in FIG. 1B, for a hypothetical asymmetrical beam the beam center line is still midway between the —3 dB points, by definition, but at the —10 dB level the point midway between the —10 dB envelope intersection points is displaced from the defined center line based on the —3 dB points. Thus, a receiver measuring beam center at the —3 dB power level will not be subject to an error resulting from beam asymmetry, but receivers relying on beam center determinations made at other power levels will be subject to errors caused by the lack of beam symmetry. In FIG. 1B, line A represents the defined beam center, line B is the actual beam center line of the asymmetrical beam illustrated, displacement C represents the error between actual and defined beam centers and D is the beam envelope.

In order to reduce receiver sensitivity to thermal noise or multipath reception effects or for other reasons it may be desirable to utilize receiver designs which operate on the basis of measurements involving power levels other than a defined standard power level such as —3 dB, however, it has not been possible to do so independently of errors caused by beam asymmetry. It should further be noted that ICAO has recognized that such asymmetry errors are inherent in the MLS beam as specified and has determined that beam specifications will not be revised to change the permissible levels of beam asymmetry.

It is therefore an object of this invention to provide receivers substantially immune to angle determination error resulting from beam asymmetry and MLS receivers capable of determining aircraft position with increased accuracy.

SUMMARY OF THE INVENTION

In accordance with the present invention, a receiver for determining beam center timing of a scanned beam having a beam center defined at a standard power level includes first means for coupling signals representative of signals received as a beam scans an antenna element and second means responsive to such signals for developing beam envelope signals representing a power level profile of the scanned beam. The receiver also includes signal processing means responsive to beam envelope signals at a first power level above and a second power level below the standard level for developing beam center scan time data in which beam center timing errors at the first and second power levels are offset. As a result, beam center scan time can be determined for asymmetrical beams by measurements at desired power levels, such as power levels at approximately equal power level differentials above and below the standard power level.

Also in accordance with the invention, an MLS receiver comprises first means for coupling signals from an MLS beam and second means for developing beam envelope signals representing a power level profile of the MLS beam. The receiver includes signal processing means, responsive to beam envelope signals at a first power level xdB above a —3 dB reference power level and a second power level approximately xdB below the reference level, for developing beam center scan time figures for TO and FRO beam scans and for deriving from elapsed time between such scan time figures an indication of beam pointing angle usable in MLS position determinations in combination with distance data.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 6 includes seven signal plots useful in describing operation of the FIG. 5 receiver.

FIG. 7 is a copy of a computer representation of beam asymmetry errors relevant to design of the FIG. 5 receiver.

FIG. 8 is a copy of a computer representation of receiver internal signals relating to evaluation of the FIG. 7 asymmetry error representation.

DESCRIPTION OF THE INVENTION

Figure 1B:
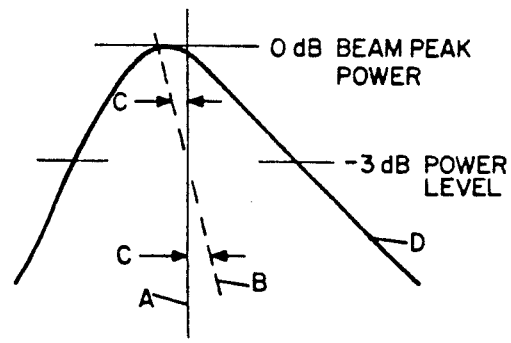
Figure 2:
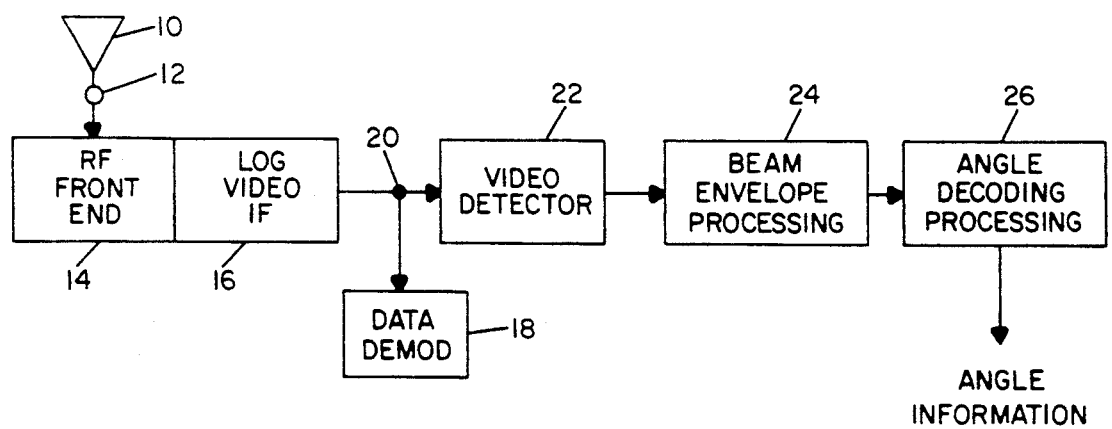
FIG. 2 is a basic airborne receiver block diagram.

FIG. 2 shows a block diagram of a basic form of airborne receiver applicable to the invention. The receiver includes an antenna element 10 for receiving a scanned beam and first means for coupling signals from the antenna element, shown as terminal 12. RF front-end 14 converts received radio frequency signals to intermediate frequency signals and the log video IF block 16 provides an output at terminal 20 suitable for data demodulation in block 18 and detection in block 22. Second means, shown as video detector unit 22, is responsive to the received signals as coupled from unit 16 and develops beam envelope signals representing a power level profile of the scanned beam, such as indicated by curve D in FIG. 1B for example. As shown, the receiver also includes beam envelope processing means 24 for developing beam center scan time data and angle decoding processing means 26 for determining aircraft angle data relative to ground reference points, which is usable in determining aircraft position information when processed in combination with distance, scan function and encoding, and other data provided in navigation system operation and coupled from unit 18 and other sources.

It should be noted that the components and operation of various prior forms of MLS and navigation system receivers are well known and, while the present invention may make use of such known components, the particular arrangements and interactions provided in accordance with the present invention result in improved forms of receivers as will be described.

Figure 1A:
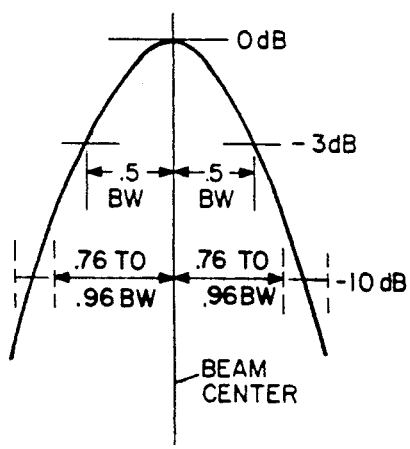
FIGS. 1A, B and C are, respectively, representations of a standard MLS beam profile, an asymmetrical MLS beam profile, and asymmetry errors in an MLS beam.

In the MLS data encoding technique the angle decoding processing unit 26 uses the elapsed time between successive passes of the MLS azimuth or elevation beam relative to antenna element 10 on an aircraft and converts the measured elapsed time to angle guidance information. The elapsed time is more particularly defined as the time between TO and FRO beam center scan times in successive passes of the beam. The "TO" and "FRO" beam centers are defined in the MLS encoding as the beam midpoints between the two −3 dB points on the leading and trailing edges of the scanned beam main lobe as indicated in FIG. 1A. As noted, the specification does not require the beam to be symmetrical. As shown in FIG. 1B, for example, the beam midpoint between the −10 dB points need not be coincident with (i.e., scan past an antenna element at the same time as) the beam center as defined by the midpoint between the −3 dB points.

In analyzing effects of asymmetrical beams permissible within the international operational standards established by ICAO for MLS ground equipment, applicant has determined that the type of asymmetry that can be present in the case of an array antenna producing a scanned beam is fundamentally constrained. Applicant has also established that with the MLS −3 dB power level beam center standard it is possible to offset asymmetry errors produced when beams are sampled at power levels other than the standard level. Thus, the synthesis or design of an asymmetrical beam is aperture limited and the highest asymmetrical angular frequency component is given by:

$$f(\theta) = \sin(\pi\theta/(\lambda/D))$$

where $\lambda$ = wavelength and D = aperture width. This component, when combined with the main beam, will cause the maximum degree of asymmetry. The period of the asymmetrical component is equal to two times the aperture beam width ($\lambda/D$).

Figure 1C:
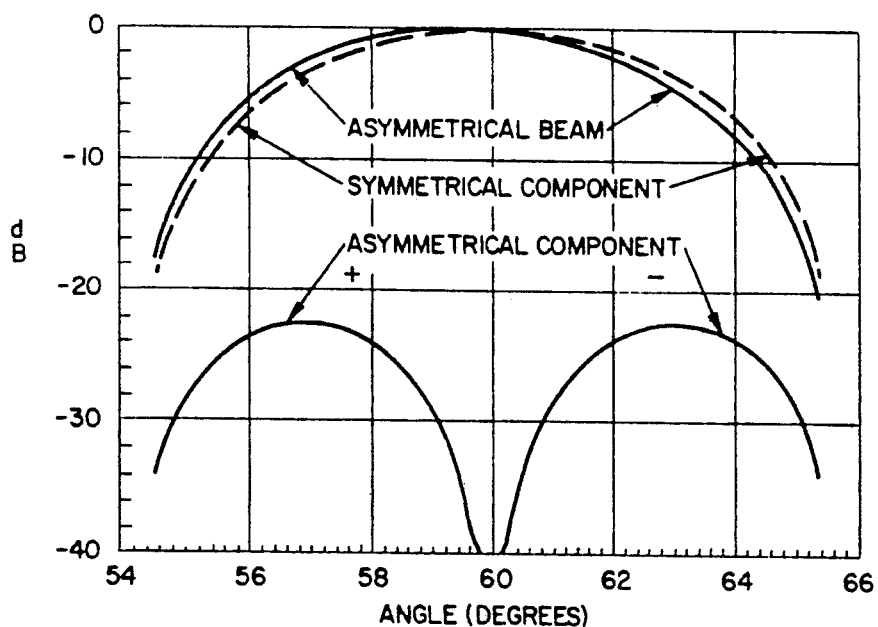

The asymmetrical beam caused by electronic scanning can be resolved into symmetrical and asymmetrical components. As shown in FIG. 1C, the asymmetrical component is predominantly:

$$f(\theta) = \sin(\pi\theta/BW)$$

where BW = beamwidth at a particular scan angle. Since the nature of beam asymmetry is thus indicated to be the same for intentional (by design) or unintentional (electronic scan) reasons, this solution regarding beam asymmetry magnitude is considered to be universal in applicability.

Figure 3:
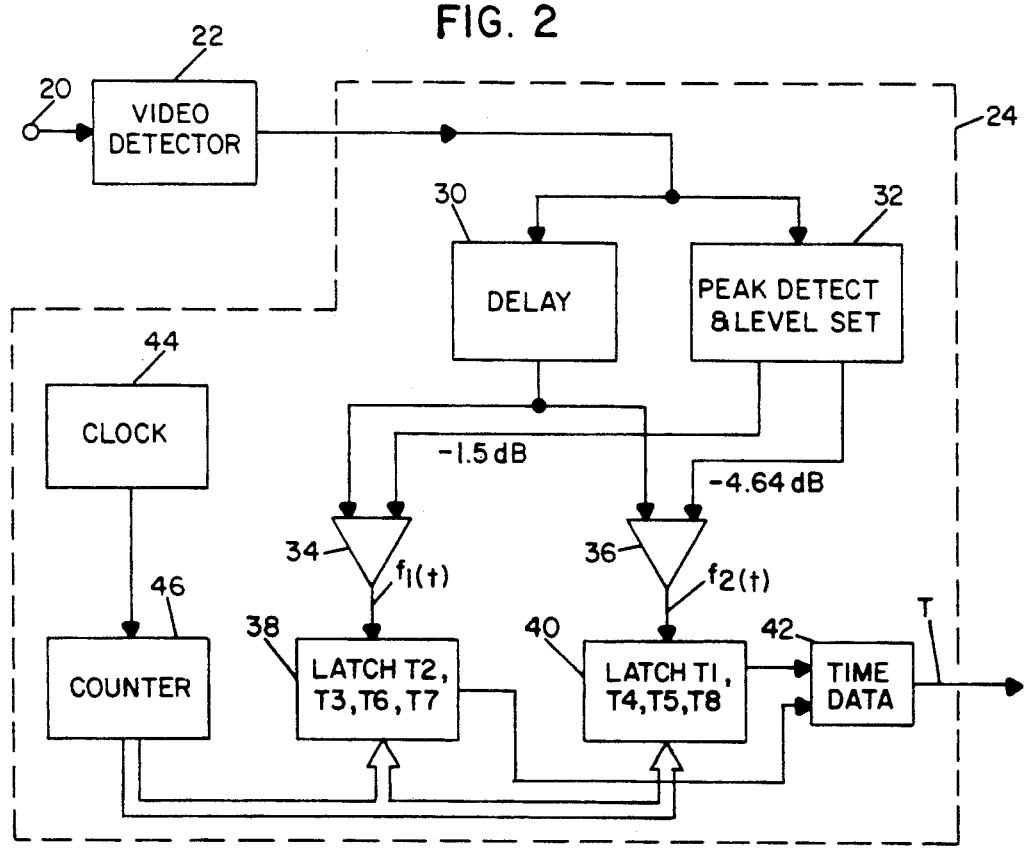
FIG. 3 is a diagram of a first embodiment of the invention and FIG. 3A shows a comparator such as used in FIG. 3.
Figure 4A:
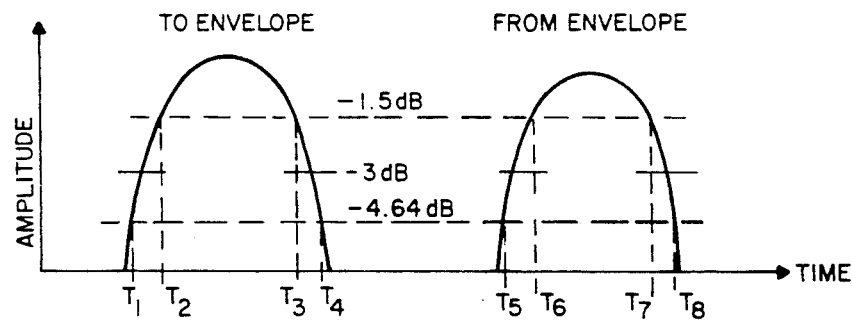
FIG. 4 includes three signal plots useful in describing operation of the FIG. 3 receiver.

Referring now to FIG. 3, there are illustrated more specifically portions of the FIG. 2 receiver in accordance with the present invention. As illustrated, first means shown as terminal 20 couples signals representative of signals received by antenna 10 to second means shown as video detector 22 and resulting beam envelope signals are in turn coupled to signal processing means 24 shown as a more specific embodiment of beam envelope processing means 24, in accordance with the invention. Beam envelope signals, such as shown in FIG. 4A, are coupled from video detector 22 to delay unit 30 and peak detector and level set unit 32. Shown in FIG. 4A are TO and FRO beam power level profiles with dotted horizontal lines indicating a first power level at −1.5 dB, which is above the −3 dB MLS standard power level, and a second power level at −4.64db, which is below the MLS standard level. In FIG. 4A, the vertical coordinate represents beam power level amplitude and the horizontal coordinate represents time, with the respective intersections of the first and second power level lines with the TO and FRO envelopes marked off as times $T_1$ to $T_8$. Thus, the first power level at −1.5 dB intersects the TO profile at $T_2$ and $T_3$ and the FRO profile at $T_6$ and $T_7$. Correspondingly, the second power level at −4.64 dB intersects the TO profile at $T_1$ and $T_4$ and the FRO profile at $T_5$ and $T_8$.

Figure 3A:
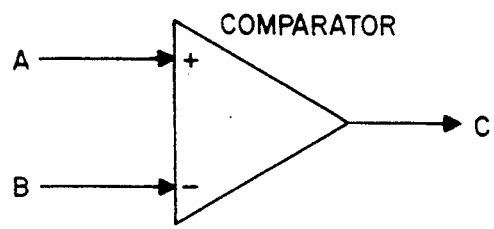
Figure 4B:
Figure 4C:
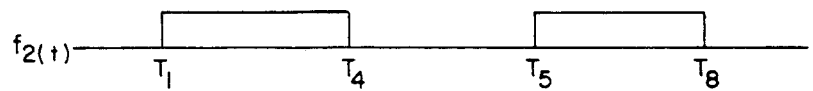

In the FIG. 3 circuit, unit 32 detects peak power of the beam envelope signals in order to establish the desired first and second power levels relative to peak. Then when delayed representations of beam envelope signals arrive at operational amplifiers 34 and 36 from delay unit 30 coincident with the first and second level information from unit 32, comparators 34 and 36 operate to develop pulses as shown in FIGS. 4B and 4C. respectively. With reference to FIG. 3A, a comparator such as 34 is effective to provide an output signal at C when an input at A equals or exceeds an input at B, and a reference output when the A input is less than the B input. Latch units 38 and 40 receive the pulse signals and store the times $T_1$ through $T_N$, and this time information is used to develop beam center scan time data in time data unit 42 representing elapsed time between successive TO and FRO beam center scans. The time T between TO and FRO beam center scans is given by:

$$T = \frac{T' - T''}{2}, \text{ where}$$

$$T' = \frac{T_3 - T_6}{2} - \frac{T_3 - T_2}{2} \text{ and}$$

$$T'' = \frac{T_5 - T_8}{2} - \frac{T_4 - T_1}{2}$$

As shown in FIG. 3, latch units 38 and 40 operate under the control of clock 44 and counter 46 in connection with the storage of times $T_1$ through $T_N$. Other portions of the FIG. 3 receiver may be as shown in FIG. 2.

The overall operational result is that even for an asymmetrical beam such as shown in FIG. 1B, beam center scan times and elapsed time between TO and FRO scans are accurately determined by offsetting beam center timing errors as power levels above and below the −3 dB MLS power level standard for beam center measurements. Applicant has determined that by choosing first and second levels at −1.5 dB and −4.64 dB the respective errors indicated at C in FIG. 1B offset each other to permit accurate timing determinations even with asymmetrical beams. Other pairings of first and second power levels for offset of asymmetry errors in the FIG. 3 type receiver are as follows:

| Level 1 (−dB) | Level 2 (−dB) |
|---|---|
| 0.00 | 5.77 |
| 1.00 | 5.03 |
| 1.50 | 4.64 |
| 2.00 | 4.25 |

In addition to sampling the beam envelope above and below the standard power level, in some applications it may be desirable to also sample the beam envelope at the standard power level (−3 dB for MLS). In that case unit 32 would additionally set a −3 dB level and parallel comparator and latch units would derive intersect times representing a T''' to be added to T' and T'' and divided by 3 in deriving T as previously described.

Figure 5:
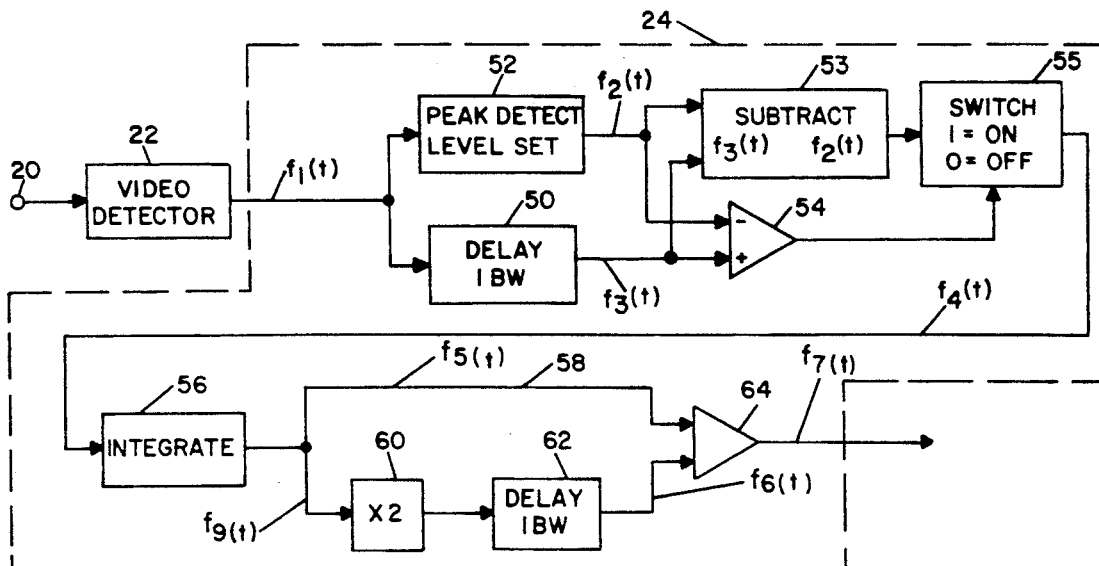
FIG. 5 is a diagram of a second embodiment of the invention.

Referring now to FIG. 5 there are illustrated portions of the FIG. 2 receiver in accordance with what is now considered the preferred embodiment of the invention. As illustrated, first means shown as terminal 20 couples signals from antenna 10 to second means shown as video detector 22, and resulting beam envelope signals are, in turn, coupled to signal processing means 24 shown as a form of split gate processor means in accordance with the invention. Beam envelope signals such as $f_1(t)$ shown in FIG. 6A, representing either a TO beam scan or successive FRO beam scan, are coupled from detector 22 to delay unit 50 and peak detector and level set unit 52. Unit 52 detects peak power of the beam envelope signal in order to establish a second power level relative to the peak power level (which, in this case, is used as the first power level) in defining limits in deriving an integral as will be described. This second power level represented by $f_2(t)$, as shown in FIG. 6B, may be advantageously set at −5.8 dB in accordance with the invention. As shown, the $f_2(t)$ signal and a delayed representation of the beam envelope signal, $f_3(t)$ as shown in FIG. 6C, are coupled to subtract unit 53 and comparator 54, which controls switch unit 55. Unit 53 subtracts the $f_2(t)$ signal from the $f_3(t)$ signal so that the portion of the beam envelope signal exceeding the selected power level of −5.8 dB is passed to the output of switch 55 as the $f_4(t)$ signal in FIG. 6D.

Integration unit 56 is effective to provide the integral of the $f_4(t)$ signal between the selected first and second power levels (beam peak and −5.8 dB power levels, respectively) as shown by the $f_5(t)$ signal in FIG. 6E. Comparator 64 receives inputs in the form of the $f_5(t)$ signal via lead 58 and a signal representing the $f_5(t)$ signal after amplification by a factor of two in amplifier 60 and delay by an equivalent of one beamwidth in delay unit 62 to provide signal $f_6(t)$, as shown in FIG. 6F. Unit 64 is effective to derive from the $f_5(t)$ and $F_6(t)$ signals the $f_7(t)$ signal as shown in FIG. 6G which includes information representative of the beam center scan time with offset of beam asymmetry errors.

If time t in FIG. 6G has been derived for a TO beam scan it can be denominated $T_{TO}$. On the subsequent FRO beam scan t representative of $T_{FRO}$ will be determined as described with reference to FIGS. 6A to 6G. Time data unit 66 then determines the time T between the successive TO and FRO beam scans on the basis of:

$$T = T_{FRO} - T_{TO}$$

Referring again to FIG. 1B, it will be seen that the FIG. 5 receiver utilizes the invention through design and operation of a receiver configured to take advantage of applicant's discovery that integration of envelope signal areas over a range between a first peak power level and a second power level of approximately 5.8 dB below peak provides an immunity to beam asymmetry errors. As previously discussed, the MLS beam center is defined as the midpoint between the −3 dB beam power level points, however, for asymmetrical beams, measurements at other power level are subject to errors. As indicated in FIG. 1B these errors are in opposite directions above and below the −3 dB power level standard. By operation tied to the −5.8 dB power level, the FIG. 5 receiver is able to provide improved thermal noise and multipath resistant operation while remaining essentially immune to beam asymmetry errors as a result of the offset of asymmetry errors above and below the standard −3 dB power level. While operation utilizing the −5.8 dB level is considered to be particularly advantageous for use with current MLS standard encoding, it will be apparent that operation using error offset based on different power levels may be provided in other applications in accordance with the invention.

FIG. 7 is a representation of beam asymmetry error in degrees versus second power level in dB below peak beam power, denoted as the "Split Gate Level." FIG. 7 was produced by a computer simulation based on a FIG. 5 type receiver with a 1 MHz sample rate, with interpolation, and producing beam center time scan information subject to a processing time delay of two beamwidths as discussed (150 microsecond delay for each 1.5 degree beamwidth). FIG. 7 clearly shows the significance of the −5.8 dB level in providing immunity to beam asymmetry errors inherent in the MLS scanned beams. FIG. 8 is a computer plot representative of the internal receiver processes for applicant's receiver shown in FIG. 5 produced by the same computer simulation and providing graphic representation of the results of internal receiver processes fully consistent with the similarly labeled signal forms illustrated in FIG. 6.

While there have been described what are believed to be the preferred embodiments of the invention, those skilled in the art will recognize other and further modifications as may be made thereto without departing from the invention and it is intended to claim all such changes and modifications as fall within the full scope of the invention.

What is claimed is:

1. A receiver for determining beam center timing of a scanned beam having a beam center defined at a standard power level but wherein said beam as received may be subject to asymmetry, comprising:

means for supplying signals representative of signals received as said beam scans an antenna element;

means for detecting said supplied signals to develop therefrom beam envelope signals representing a power level profile of said scanned beam;

means, responsive to said beam envelope signals, for deriving signals representing an integral of beam envelope signals between a first level representing the peak power level of said scanned beam and a second level representing a power level of approximately 5.8 db below said peak power level, whereby beam center symmetry errors between said peak and second power levels are effectively offset through said integration process; and means, responsive to said integral signals, for deriving therefrom signals usable for determining beam center scan time for said scanned beam irrespective of asymmetry in said scanned beam as received.

2. A receiver in accordance with claim 1, wherein said standard power level is 3 db below said peak power level.

3. A receiver in accordance with claim 1, wherein said scanned beam is the beam of a microwave landing system (MLS) and said receiver is an MLS receiver.

* * * * *